United States Patent [19]
Lauzon

[11] Patent Number: 5,977,982
[45] Date of Patent: *Nov. 2, 1999

[54] SYSTEM AND METHOD FOR MODIFICATION OF THE VISUAL CHARACTERISTICS OF DIGITAL 3D OBJECTS

[75] Inventor: Laurent Lauzon, Montreal, Canada

[73] Assignee: Avid Technology Inc., Tewksbury, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/672,287

[22] Filed: Jun. 28, 1996

[51] Int. Cl.$^6$ ............................................. G09G 1/06
[52] U.S. Cl. ................................. 345/430; 345/431
[58] Field of Search ..................... 345/430, 426

[56] References Cited

U.S. PATENT DOCUMENTS

| | | | |
|---|---|---|---|
| 4,343,037 | 8/1982 | Bolton | 345/430 |
| 4,586,038 | 4/1986 | Sims et al. | 345/430 |
| 4,935,879 | 6/1990 | Ueda | 345/430 |
| 5,452,372 | 9/1995 | Shirasaka | 345/430 |
| 5,659,671 | 8/1997 | Tannenbaum et al. | 345/426 |

OTHER PUBLICATIONS

P. Hanrahan and P. Haeberli, "Direct WYSIWYG Painting and Texturing on 3D Shapes", Computer Graphics ACM, vol. 24 No. 4 pp. 215–223, Aug. 1990.

P. Litwinowicz and G. Miller, "Efficient Techniques for Interactive Texture Placement", Computer Graphics Proceedings ACM, Annual Conference Series, pp. 119–122, 1994.

*Primary Examiner*—Mark R. Powell
*Assistant Examiner*—Huedung X. Cao
*Attorney, Agent, or Firm*—Robert P. Stratton; Omar A. Nassif; Arne I. Fors

[57] ABSTRACT

"A system and method for modification of the visual characteristics of digital 3D objects includes a shading buffer wherein parameters relating to the visual characteristics of a rendered 3D object are stored. When a texture applied to the 3D object is selected for modification, a pre-rendering step is performed and a shading buffer constructed. The shading buffer includes pre-computed components of the visual characteristic information for each rendered pixel of the displayed 3D object, these components are independent of the texture selected for modification. When the texture is modified, by indicating one or more pixels on the 3D object to which the texture is applied, re-rendering of those pixels is accomplished by evaluating a simple combination of the corresponding pre-computed components in the shading buffer and the modification effected to the selected texture to obtain new final values to render the pixels. By pre-computing and arranging the components in the shading buffer, the computational requirements for re-rendering the modified portions of the 3D object are reduced, allowing real time re-rendering in many circumstances."

15 Claims, 3 Drawing Sheets

SYSTEM AND METHOD FOR MODIFICATION OF THE VISUAL CHARACTERISTICS OF DIGITAL 3D OBJECTS

FIELD OF THE INVENTION

The present invention relates to a system and method for the modification of the visual characteristics of a three dimensional (3D) object.

BACKGROUND OF THE INVENTION

Systems which provide for the modification of visual characteristics of digital objects are well known. As used herein, the terms "paint system" and "paint" are intended to comprise any system or method by which a user may modify the visual characteristics of a digital 3D object and can include, without limitation, modifying existing textures, or applying new textures, moving (translating) textures, etc.

Digital paint systems range from the ubiquitous two dimensional Paintbrush program in Microsoft Windows 3.1 to high-end 3D digital paint systems such as SoftImage 3D which includes a 3D paint module, amongst others. 3D digital paint systems allow an artist to paint or otherwise modify the visual characteristics of a 3D object, which has been previously defined, to obtain a 3D object which has a desired visual appearance when it is rendered.

3D paint systems may apply a single color to a 3D object to, for example, paint a portion of a surface of the object a solid color. When rendered, even though a single solid color has been applied to the object, the colors on the displayed 3D object can vary due to changes in lighting, surface geometry of the object, etc. In a more interesting case, the 3D paint system may provide more advanced modification techniques such as the ability to apply or modify textures on the 3D object. For example, a texture which replicates a wood grain could be applied to one or more surfaces of the 3D object so that the rendered object appears to have been made of wood.

Textures can comprise a wide range of visual characteristics including photographic or other images, patterns such as woodgrain or marble, or effects which have no counterpart in the physical world such as reflection or refraction maps. Further, multiple textures can be composited onto the 3D object and the paint system can provide for the user to paint onto a texture which has been applied to the object. In fact, a texture can comprise a solid, single color and thus the above-described application of a single solid color to a 3D object is a trivial case of the application of a texture.

A discussion of the application of textures to 3D objects is given in "Direct WYSIWYG Painting & Texturing on 3D Shapes", Hanrahan & Haeberli, ACM Computer Graphics, Volume 24, Number 4, August 1990, pp.215–223, the contents of which are incorporated herein by reference.

To provide the desired visual feedback to the artist during the process of applying or modifying a texture, it is desired that the display of the 3D object be updated, substantially in real time, as the modification operation is performed. However, due to the computational complexity involved in rendering 3D objects, which can include calculating the effects of the object geometry, lighting, the user's point of view and a variety of composited textures, prior art 3D systems have typically required special purpose computer systems or additional hardware such as expensive graphics accelerators in order to provide an acceptable response time to the user, i.e.—substantially real time rendering and display of the result of the modification operation.

Previous attempts have been made to mitigate the requirement for special purpose hardware. For example, somewhat improved techniques of texture application are discussed in "Efficient Techniques for Interactive Texture Placement", Litwinowicz and Miller, ACM Computer Graphics Proceedings, Annual Conference Series, 1994, pp.119–122, the contents of which are incorporated herein by reference. However, even with these techniques, unless special equipment is employed, the response time of the 3D paint system is slower than is desired.

SUMMARY OF THE INVENTION

It is an object of the present invention to provide a novel system and method for modification of the visual characteristics of digital 3D objects which obviates or mitigates at least one of the disadvantages of the prior art systems.

According to a first aspect of the present invention, there is provided a method of updating the rendered display of a 3D object in response to interactive modification of the visual characteristics of said 3D object, comprising the steps of:

(i) selecting a 3D object definition including geometric shape information;

(ii) selecting for subsequent modification one of a predefined texture associated with said 3D object and a new texture for said 3D object, said textures comprising visual characteristic information for rendering said 3D object;

(iii) determining for each pixel which is to be rendered for said selected 3D object on said display each component of said visual characteristic information which is independent of modifications effected to said selected texture;

(iv) storing for each pixel which is to be rendered for said selected 3D object said determined components in a suitable storage means;

(v) rendering and displaying said selected 3D object;

(vi) receiving input representing an indication of one or more rendered pixels of said 3D object representing a portion of a said selected 3D object whose visual characteristics are to be modified and a selected modification therefor;

(vii) determining a new rendered value for each pixel of said selected 3D object in said portion by evaluating for each pixel corresponding ones of said determined components stored in said suitable storage means with said selected modification effected by said user;

(viii) updating said display to show a rendering of said selected 3D object which includes said determined new rendered values; and (ix) repeating steps (vi) through (viii) as desired.

According to another aspect of the present invention, there is provided a computer implemented system for user modification of visual characteristics of digital 3D objects, comprising:

means to select a 3D object definition including a definition of the geometry of said 3D object;

means to select a texture from at least one texture associated with said selected 3D object, each said at least one texture representing visual characteristic information of said selected 3D object to be evaluated when rendering pixels for display of said 3D object;

means to determine the components of visual characteristic information for said selected 3D object which are independent of said selected texture;

means to store said determined components;

means to render pixels representing said 3D object for display on a display means;

means to select a modification operation to modify said selected texture;

means to modify a portion of said selected texture with said selected modification; and means to determine new rendering values for said pixels in response to said modification of said selected texture, said means to determine employing said stored determined components and said modified portion of said selected texture.

According to another aspect of the invention there is provided, in a computer implemented system for modification of the visual characteristics of digital 3D objects whose definitions include geometry information and at least one texture comprising visual characteristics to be rendered and wherein modification comprises the interactive modification of visual characteristics of a 3D object, a method of re-rendering the 3D object on a display when a modification is performed, including the steps of:

(i) receiving input to select said one texture for the modification operation to act on;

(ii) determining, once said texture is selected and prior to commencement of the modification operation, the components of said visual characteristic information which are constant for said selected texture and storing said determined components in a memory;

(iii) receiving input representing the modification of portions of said selected texture by said modification operation;

(iv) determining new rendering values for said 3D object by evaluating said modified portions of said selected texture with corresponding ones of said determined components stored in said memory;

(v) redisplaying said 3D object with said new rendering values to reflect said modifications effected by said modification operation.

According to yet another aspect of the present invention, there is provided an article of manufacture comprising:

a computer usable medium having computer readable program code means embodied therein for implementing a system for modification of the visual characteristics of 3D objects, the computer readable program code means in said article of manufacture comprising:

computer readable program code means for causing the computer to accept input representing the selection of a definition of a 3D object, the definition having associated therewith at least one texture comprising visual characteristic information of the 3D object which is subject to modification by said system and which is evaluated in rendering the 3D object on a display;

computer readable program code means for causing the computer to accept input representing a selection of one texture for modification;

computer readable program code means for causing the computer to determine and store components of the visual characteristic information required to render and display the 3D object, the determined and stored components being independent of the one texture selected;

computer readable program code means for causing the computer to receive input representing a selection of a modification operation and the portions of the selected texture which are to be modified by the selected modification operation;

computer readable program code means for causing the computer to re-render the modified portions of the 3D object corresponding to the modified portions of the selected texture, the re-rendering being accomplished by combining the corresponding stored components and the modified portions of the selected texture.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
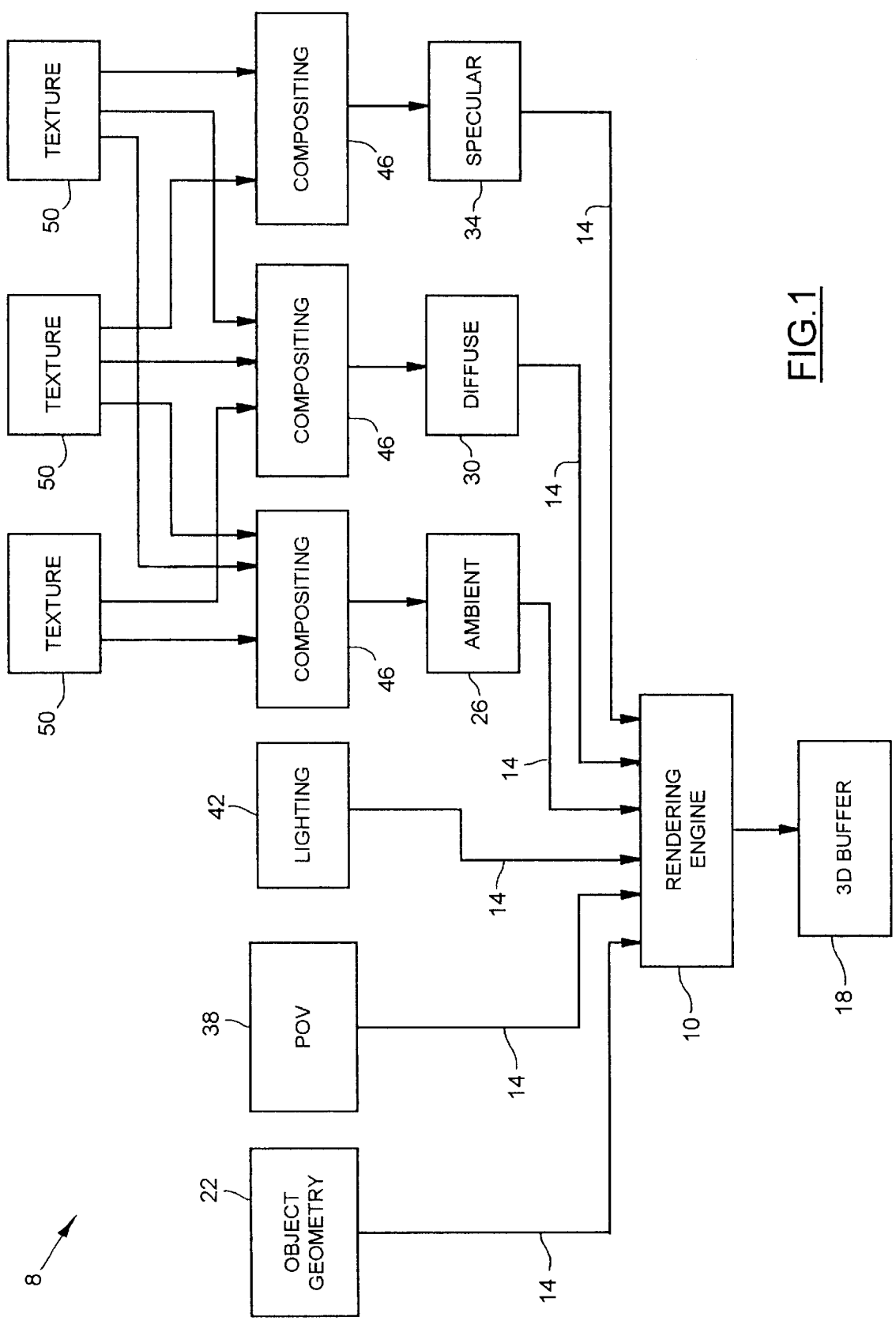
FIG. 1 is a block diagram showing of a portion of the inter-relationship of components in an embodiment of the present invention.

FIG. 1 shows a block diagram of a portion of the data hierarchy 8 in a 3D system in accordance with an embodiment of the present invention. In this system, a Rendering Engine 10 receives a variety of inputs 14 from which it produces an appropriate rendering of a 3D object into a 3D Buffer 18 for subsequent display. The 3D object which is to be displayed has associated with it an Object Geometry 22, which has been previously defined for the object in any suitable manner as would occur to those of skill in the art, and Ambient 26, Diffuse 30 and Specular 34 color information. Information regarding the user's point of view of the object, POV 38, and information regarding the lighting of the object, Lighting 42, are also associated with the 3D object.

In data hierarchy 8, the 3D object to be rendered is stored as a persistent object and Object Geometry 22, POV 38, Lighting 42 and the Ambient 26, Diffuse 30 and Specular 34 information are stored as persistent data items, although the present invention is not limited to such a hierarchy.

Rendering Engine 10 processes inputs 14 from the Ambient 26, Diffuse 30, Specular 34, Object Geometry 22, POV 38 and Lighting 42 objects to produce the rendered image of the 3D object which is placed in 3D buffer 18.

In hierarchy 8, the information for Ambient 26, Diffuse 30 and Specular 34 persistent objects comes from one or more Compositing objects 46, each of which can accept and process input from one or more textures 50. In the present invention, a user can apply a variety of visual appearances to the 3D object. For example, an artist or user may wish to apply a texture 50 resembling a brick wall pattern to the surface of the 3D object and then paint a second texture 50 with a partially translucent color and composite the two textures 50, with the translucent paint texture 50 on top of the brick pattern texture 50, to mimic on the surface of the object the look of graffiti painted on a brick wall.

In the prior art, when a texture is applied, painted or otherwise modified, the 3D object is re-rendered, with the updated texture information, changing the visual characteristics of the 3D object displayed to the user. This rendering process is computationally expensive (complex) and real time re-rendering of the 3D object in the prior art systems has been difficult, at best, without special graphics hardware.

The present inventor has determined that, when the digital painting or other modification process is constrained such that only a single texture 50 can be modified at one time, it is possible to improve the performance of the re-rendering process. Specifically, the present inventor has determined that the visual characteristic information which will be processed by Rendering Engine 10 can be arranged in terms of components which are constant, i.e.—do not change as a selected texture 50 is modified, and components which can change as a selected texture 50 is modified. Once the visual characteristic information is arranged in this manner, it is possible to pre-compute the components of the visual characteristic information which are constant and to store these pre-computed components in a suitable buffer, referred to herein as a shading buffer.

Thus, when a selected texture 50 is being modified or applied to the 3D object, Rendering Engine 10 need only perform the final rendering steps of appropriately combining the corresponding pre-computed components in the shading buffer with the components dependent on the user's modification of the selected texture 50 and therefore the number and overall complexity of the calculations which are desired to be performed in real time is reduced. Further, this re-rendering is not performed for the entire 3D object, but only for those rendered pixels whose visual characteristics will change as a result of the modification of texture 50.

The present inventor has determined that this reduction is significant and a 3D digital paint system embodying this invention can provide modification or placement of textures (painting) with substantially real time re-rendering of 3D objects on general purpose computer systems such as an IBM PC compatible system with a 90 MHz Intel Pentium processor and running Microsoft Windows NT V3.51, this substantial real time performance being equivalent to that obtained with prior art 3D digital painting systems running on special hardware such as Silicon Graphics Irix workstations. The advantages of the present invention are particularly apparent when complex 3D objects are being painted and/or multiple light sources are illuminating the 3D object.

Figure 2:
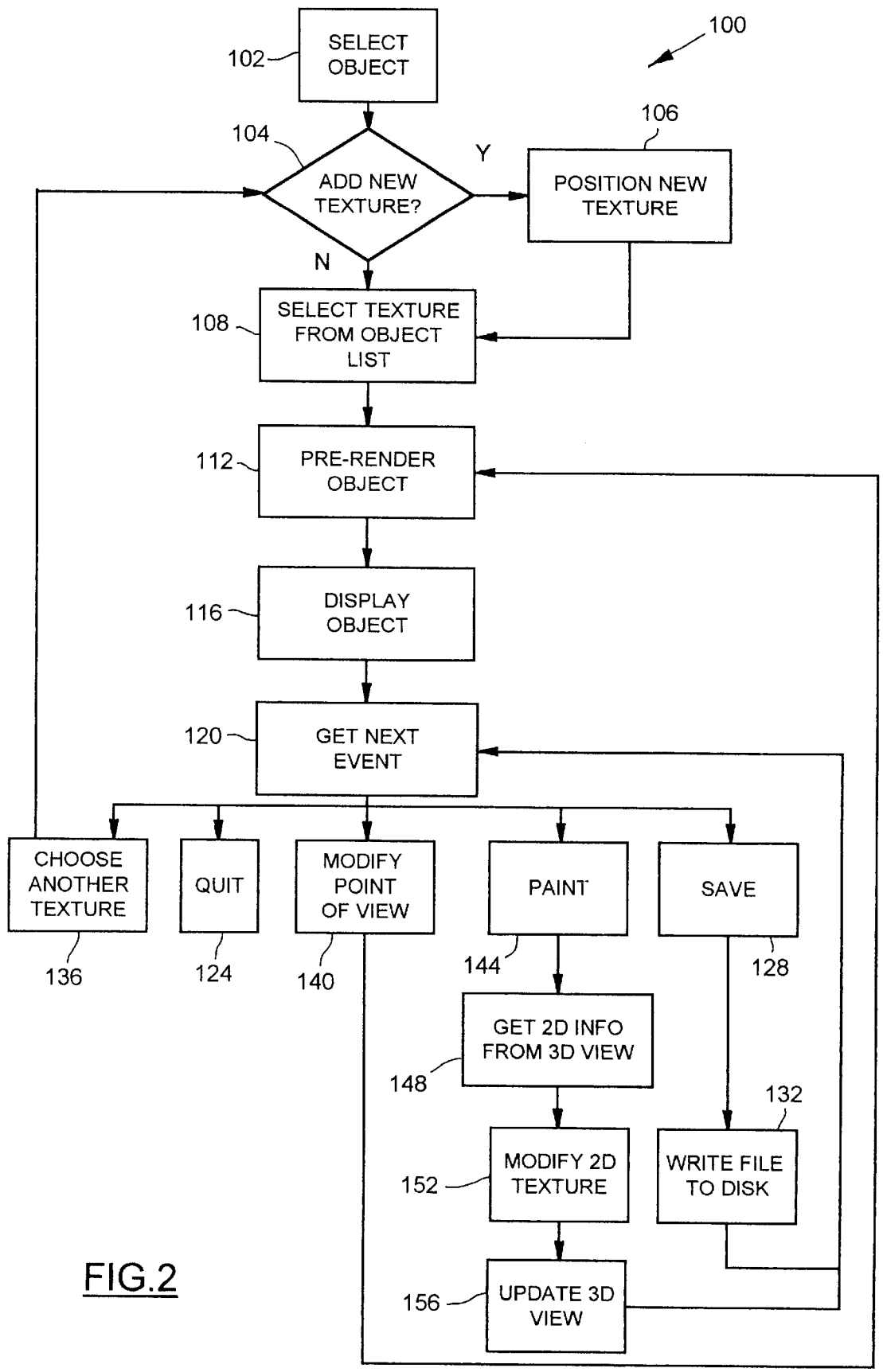
FIG. 2 shows a block diagram of an event loop in the embodiment of FIG. 1.

FIG. 2 shows a block diagram of an embodiment of a 3D system 100 in accordance with the present invention. In system 100, the user selects a previously defined object for subsequent modification at Select Object step 102. A used herein, the term user comprises an artist or other user, an input macro or script, or any other suitable input as will occur to those of skill in the art.

As mentioned above, the selected 3D object can be an object which has previously been constructed with a 3D modelling tool or created via any other suitable object creation process, as will occur to those of skill in the art. At Add New Texture step 104, the user is given the opportunity to allocate a new texture for the selected object, if this is desired. If a new texture is to be allocated, the user positions the new texture on the selected 3D object at Position New Texture step 106. At Select Texture From Object List step 108, the user selects a texture 50 associated with the object, either an existing texture or a texture newly allocated at steps 104 and 106, which will be painted or otherwise modified.

As will be described below in more detail, once a texture 50 has been selected at Select Texture From Object List step 108, the 3D object is pre-rendered at Pre-Render Object step 112 to form a buffer of rendered pixels, 3D buffer 18 in FIG. 1, which will be used to display the 3D object. Pre-render Object step 112 also comprises the construction of a 'shading buffer' which includes, for each pixel of the 3D object which is displayed (i.e.—each non-empty pixel in the 3D buffer), the above-mentioned pre-computed components of the visual characteristic information. As is further discussed below, the pre-computed components are calculated once a texture 50 has been selected for modification and must be re-computed each time a different texture 50 is subsequently selected for modification.

As mentioned above, the pre-computed components of the rendering values placed in the shading buffer are derived from the visual characteristic information which is independent of the texture 50 selected for modification, as will be apparent from the following discussion.

For the case wherein the selected texture 50 is composited with one or more other textures, the shading buffer is constructed as follows. As those of skill in the art will realize, equation 1 in Appendix A is the general equation for simple compositing of two textures with the use of an alpha mask. Specifically, the final value C of a pixel is a linear interpolation between the pixel values, namely $C_0$ and $C_1$, of the two textures being composited. The value of the alpha mask $A_1$ represents the relative contribution of the pixel value $C_1$ and the value $(1-A_1)$ represents the contribution of the pixel value $C_0$.

Equation 2 in Appendix A shows a similar general equation for compositing 'n' textures. Equation 3 shows a rearrangement of equation 2 to group the various factors in terms of the image pixel colors '$C_n$'. If texture $T(C_i, A_i)$, where $C_i$ is the color of the pixel in the texture T and $A_i$ is the alpha mask value associated with that pixel in texture T, is the texture being modified (currently selected), equation 3 can be re-expressed as shown in equations 4 through 7 in Appendix A.

As will be apparent from equation 5, the value '$C_k$' includes all of the colors and alpha mask values for all textures, except those values in the selected texture $T(C_i, A_i)$. Essentially, $C_k$ is a cumulative color value, which is independent of the selected texture $T(C_i, A_i)$, i.e. $C_k$ is constant for a given selected texture.

As shown in equation 6, the value '$C_a$' includes all of the colors and alpha mask values for all of the textures below (behind) the selected texture $T(C_i, A_i)$ and essentially, $C_a$ is a cumulative color dependent on $T(A_i)$.

As shown in equation 7, the value 'k' represents the cumulative opacity of the textures above (in front) of the selected texture $T(C_i, A_i)$ and essentially, k is a constant color factor dependent on $T(C_i)$ and $T(A_i)$, the latter due to compositing. It will be apparent to those of skill in the art that, in equation 7 the value k is not the same as the subscript k, the latter indicating the texture which is the multiplier in equation 7.

Accordingly, the shading buffer computed in Pre-render Object step 112 includes the values $C_k$, $C_a$ and k for each pixel which is displayed to the user and these are the pre-computed visual characteristic components which include the ambient, specular and diffuse colors. $C_k$, $Ca$ and k are calculated for each of the ambient, specular and diffuse colors and, when the calculations are complete, the resulting three sets of $C_k$, $C_a$ and k values for each pixel are combined into a single set of pre-computed $C_k$, $C_a$ and k components for each pixel. When paint is applied by the user to a displayed pixel, 3D system 100 determines the new final rendering value C for the displayed pixel from equation 4 with the user selected values of $C_i$ and $A_i$ and the pre-computed components $C_k$, $C_a$ and k from the shading buffer.

If there is no transparency in the current texture $T(C_i, A_i)$, (i.e. $A_i=1$), then equation 4 may be further simplified by substituting $A_i=1$ to yield equation 8 in Appendix A. As a further pre-computed step, $C_k$ and $C_a$ are summed into $C_k'$ to get obtain equation 9 in Appendix A.

The present inventor has determined that the values $C_a$, $C_k$ and k for the shading buffer can be computed relatively efficiently in a single pass through the textures for the 3D object, rather than looping several times to compute each value. Specifically, the shading buffer is allocated with storage space for each non-empty pixel in the 3D buffer and, for each non-empty pixel in the 3D buffer, the corresponding pixel in each texture is examined in turn from the top texture to the bottom texture. As is discussed in more detail below, and as will be apparent to those of skill in the art, several displayed pixels of the rendered 3D object may correspond to a single pixel in a texture 50 but an entry is maintained in the shading buffer for each displayed pixel of the rendered 3D object.

For textures in front of the selected texture $T(C_i, A_i)$, $C_k$ is calculated with the corresponding pixel and this calculated value of $C_k$ is accumulated (summed with) the value of $C_k$ (if any) for that pixel in the 3D buffer which has been previously calculated and stored in the shading buffer when processing other textures. Also, k is calculated for each corresponding pixel and the product of the calculated value and the previous value of k already stored in the shading buffer (if any) for that pixel is determined. Because $C_a$ represents factors below the selected texture, it is not calculated for textures in front of the selected texture.

If the texture being examined is the selected texture $T(C_i, A_i)$, it is not processed in the shading buffer.

For textures behind the selected texture, $C_k$ is calculated for each corresponding pixel and the calculated value of $C_k$ is accumulated (summed with) the value of $C_k$ already stored in the shading buffer (if any) for that pixel. Also, $C_a$ is calculated for each corresponding pixel and the calculated value of $C_a$ is accumulated (summed with) the value of $C_a$ already stored in the shading buffer (if any) for that pixel. Because k represents the cumulative opacity of the textures in front of the selected texture, it is not calculated for textures behind the selected texture.

For the more general case wherein the selected texture is to be painted on or moved (translated), the shading buffer is constructed as follows. The standard Phong shading function can be expressed as shown in equation 10 in Appendix A. In equation 10, $K_a$ is the ambient color of the selected texture, $K_d$ is the diffuse color of the selected texture, $K_s$ is the specular color of the selected texture, n is the number of light sources, N is the surface normal vector of the surface (pixel) of the 3D object, $L_i$ is the vector pointing at light I, $I_i$ is the intensity contributed by light I, $H_i$ is the vector halfway between $L_i$ and V, which is the vector pointing at the user/viewer and $n_s$ is the shininess of the object.

The present inventor has realized that only $K_a$, $K_d$ and $K_s$ (referred to as the characteristic ambient, diffuse and specular colors) are dependent upon the selected texture and thus, equation 10 can be rewritten to the form shown in equation 11 in Appendix A wherein $S_d$ represents the summation term in equation 10 which is multiplied by $K_d$ and $S_s$ represents the summation term in equation 10 which is multiplied by $K_s$ and wherein $S_s$ and $S_d$ are constants.

Equations 12 and 13 in Appendix A shows the expansion of the $K_a$, $K_d$ and $K_s$ terms in equation 11 by substituting the equation 4 for each of $K_a$, $K_d$ and $K_s$. Equation 14 in Appendix A shows how equation 13 is rearranged in terms of $A_i$ and $C_i$, which are dependent upon the selected texture, and the remaining terms $C_k$, $C_a$ and k which are constant for a given selected texture and thus can be pre-computed and stored in the shading buffer. It will be observed by those of skill in the art that equation 14 is the same as equation 4, however in equation 14 k is a color and not an opacity value.

As will be apparent to those of skill in the art, in this case, even when only a single texture 50 is associated with a 3D object, a shading buffer may be profitably employed. In such a circumstance, the visual characteristic information stored in the shading buffer will represent the 'shading information' for the 3D object (i.e.—the manner in which the rendered color (or colors) changes over the displayed surface of the object due to lighting and geometry, etc.) which is constant despite modification of a texture.

The shading buffer described above can be employed even if one or more of textures 50 include bump maps which alter the object geometry, provided that the selected texture does not modify the geometry of the 3D object, i.e.—the object geometry is constant during the modification operation. Further, shading buffers can be constructed for the case where texture 50 is a reflection or refraction map.

Once Pre-render Object step 112 is completed, the object, as rendered in the 3D buffer, is displayed at Display Object step 116. The display of the object at Display Object step 116 is independent of the texture selected at Select Texture From Object List step 108 and employs any textures previously defined for surfaces of the object or, in the case of an object for which a texture has yet to be applied, the display will employ a predefined default texture.

System 100 then enters an event loop for painting the object, the event loop comprising a Get Next Event event 120 and a variety of subsequent steps. For example, a user can initiate a Quit event 124 to terminate system 100. A user can also initiate a Save event 128 which results in the selected 3D object and its textures, whether modified or not, being written to disk or other storage media at Write File to Disk step 132 and system 100 returning to the Get Next Event step 120. The user can also initiate a Chose Another Texture event which returns system 100 to the Add New Texture step 104. As the contents of the shading buffer are dependent upon the texture selected, after a new texture is selected at Select Texture From Object List step 108, the Pre-render Object step 112 is performed again to construct an appropriate shading buffer and the object is displayed again at Display Object step 116 and system 100 returns to the Get Next Event step 120.

A user can also initiate a Modify Point of View event 140 which allows the user to alter the displayed viewpoint of the user relative to the displayed object. The actual interaction with the user to specify the new viewpoint can be accomplished in a variety of suitable manners, as will occur to those of skill in the art, and will not be further discussed herein. Once the desired viewpoint has been indicated to system 100, Pre-render Object step 112 is again performed to construct the new 3D buffer and to construct the shading buffer with information for the pixels which will now be displayed to the user. When Pre-Render Object step 112 is complete, the object is redisplayed at Display Object step 116 from the new viewpoint and system 100 returns to Get Next Event step 120.

When the user commences Paint event 144, changes effected to the 3D object by the user are rendered by appropriately combining the components relating to the user changes with the corresponding pre-computed components in the shading buffer and the display is updated appropriately to provide substantially real time feedback to the user.

Specifically, in Paint event 144 the user can select one or more pixels of the displayed object for modification, the selection being effected with any appropriate metaphor/technique such as with a brush tool etc., as will be apparent to those of skill in the art. System 100 then determines, at Get 2D Info from 3D View step 148, which pixels of the presently selected texture correspond to those of the object selected by the user in Paint event 144. These corresponding pixels in the selected texture are then modified appropriately, at Modify 2D Texture step 156, to reflect the modifications made by the user. Finally, the contents of the 3D buffer are updated, at Update 3D View step 156, with the selected pixels being re-rendered and the displayed object being updated appropriately.

While there are a variety of known techniques by which steps 148, 152 and 156 may be accomplished, as will be apparent to those of skill in the art, the present inventor has developed specific techniques which are believed to be novel, advantageous and which are presently preferred.

As mentioned above, in system 100 a 3D object will have one or more textures 50 associated with it and these textures are in the form of 2D data structures which are mapped to the pixels in the 3D buffer. As mentioned briefly above, depending upon the 3D object's Object Geometry 22 and the texture 50 and the POV 38 the 3D object has been rendered for, a single pixel in the texture 50 can have been mapped to several pixels in the 3D buffer 18 for the rendered object (i.e.—a single pixel in a texture can affect the rendering of several pixels in the rendered object.)

In the first of the above-mentioned techniques, to improve the performance of Get 2D Info From 3D View step 148, the present inventor has included an additional operation in Pre-render Object step 112. When the shading buffer is formed, in addition to components $C_k$, $C_a$ and k, a pointer is included for each pixel location in the shading buffer. This pointer indicates which pixel in selected texture 50 needs to be included in the rendering process for the corresponding pixel in 3D buffer 18. Thus, when a user selects one or more pixels of the displayed 3D object for modification, the appropriate corresponding pixels in the selected texture 50 are easily determined, by using these pointers, at Get 2D Info From 3D View step 148 for appropriate modification at Modify 2D Texture step 152.

In the second of these techniques, in Pre-render Object step 112 another buffer, referred to as the 2D buffer is created. This buffer corresponds in size to selected texture 50 and each location (pixel) in this buffer stores a bounding box definition. These bounding box definitions encompass each pixel in 3D buffer 18 to which the pixel in the selected texture 50 has been mapped (i.e.—the pixels in 3D buffer 18 which the pixel in texture 50 affects the rendering of). When a change is effected to the selected texture 50 by the user, via Get 2D Info from 3D View step 148 and Modify 2D Texture step 152, system 100 determines the bounding box associated with the changed pixel in selected texture 50 from the 2D buffer and, in Update 3D View step 156, only considers the pixels within the bounding box for re-rendering and updating of the display.

If more than a single pixel is changed in selected texture 50, a global bounding box, which bounds the bounding boxes of all of the modified pixels, is formed from the corresponding bounding boxes and only the pixels within this global bounding box are considered for re-rendering and updating the display.

Figure 3:
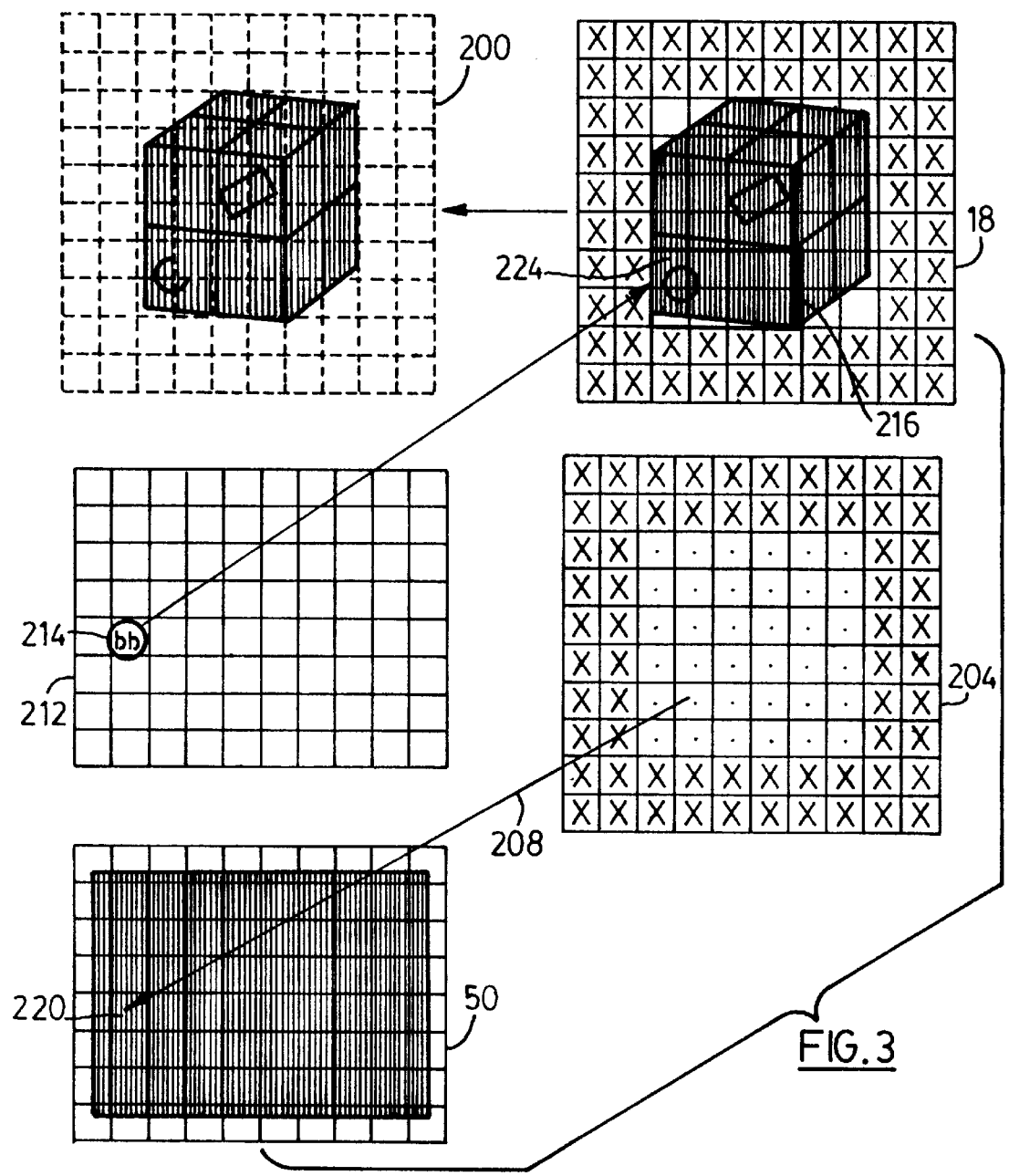
FIG. 3 shows a schematic representation of some of the data structures employed with the embodiment of FIG. 1.

The resulting data structures and the interrelationship therein are shown schematically in FIG. 3. In this Figure, a rendered cubical object is represented by a plurality of pixel data elements stored in 3D buffer 18 and these pixel data elements are appropriately displayed on a display 200. A shading buffer 204 includes a location (pixel) which corresponds to each rendered (non-empty) pixel in 3D buffer 18.

In a present embodiment of the instant invention, shading buffer 204 is implemented as another set of dimensions (for $C_k$, $C_a$, and k and the pointer to pixel in selected texture 50) which are allocated for 3D buffer 18. While this means that each pixel in 3D buffer 18 has these extra dimensions allocated for it, only those locations which correspond to non-empty pixels in 3D buffer 18 are loaded with the shading buffer values.

For clarity, in FIG. 3 shading buffer 204 is shown separate from 3D buffer 18. Each location in shading buffer 204 which corresponds to a non-empty pixel in 3D buffer 18 includes pre-computed components $C_k$, $C_a$ and k. Further, each corresponding location in shading buffer 204 includes a pointer 208 to the pixel in selected texture 50 which is considered when rendering the corresponding pixel in 3D buffer 18.

2D texture buffer 212 includes a location (pixel) corresponding to every pixel of selected texture 50. Each of these locations contains the definition 214 of a bounding box 216 which encompasses a rectilinear arrangement of the pixels in 3D buffer 18 which are mapped to the corresponding pixel 220 in texture 50.

When a user selects a pixel 224 in 3D buffer 18, by indicating a portion of the object rendered on display 200, the pointer 208 associated with pixel 224 is used to determine the corresponding pixel 220 in texture 50. The pixels in 3D buffer 18 which are within the bounding box 224, determined from 2D buffer 212, are then appropriately re-rendered, employing the pre-computed components in shading buffer 204, and display 200 is updated.

In the embodiment described above, the bounding boxes are rectilinear to simplify and reduce the storage requirements for their definitions in the shading buffer and thus are pessimistic in that they may include pixels which do not require re-rendering, especially in the case of a composite bounding box. However, it has been determined that the computational costs associated with this pessimism is more than offset by the reduced storage and data handling requirements afforded by the rectilinear bounding boxes. It has also been determined that it is possible to form bounding boxes which are even more pessimistic by forming supergroups of pixels in the shading buffer, such as four by four groups, and to store only a single appropriate bounding box definition for each of these supergroups. This further reduces the storage and data handling requirements for system 100 and yet still provides many of the benefits of this feature.

The above-described embodiments of the invention are intended to be examples of the present invention and alterations and modifications may be effected thereto, by those of skill in the art, without departing from the scope of the invention which is defined solely by the claims appended hereto.

Appendix A $$C = C_O \times (1 - A_1) + C_1 \times A_1 \quad (1)$$

$$C = ((C_O \times (1 - A_1) + C_1 \times A_1) + C_2 \times A_2) + C_3 \times A_3 \ldots \quad (2)$$

$$C = C_O \times (1 - A_1) \times (1 - A_2) \times (1 - A_3) \times \ldots \times (1 - A_{n-1}) \times (1 - A_n) + \\ C_1 \times A_1 \times (1 - A_2) \times (1 - A_3) \times \ldots \times (1 - A_{n-1}) \times (1 - A_n) + \ldots + \\ C_{n-1} \times A_{n-1} \times (1 - A_n) + C_n \times A_n \quad (3)$$

$$C = C_k + A_i \times (C_i \times k + C_a) \quad (4)$$

where:

-continued $$C_k = \sum_{j=0}^{j<i}\left[C_j \times A_j \times \prod_{k=j+1}^{k\leq j+1, k\neq i}(1-A_k)\right] + \sum_{j=j+1}^{j\leq n}\left[C_j \times A_j \times \prod_{k=j+1}^{k\leq n}(1-A_k)\right] \quad (5)$$

$$C_a = -\sum_{j=0}^{j<i}\left[C_j \times A_j \times \prod_{k=j+1}^{k\leq n, k\neq i}(1-A_k)\right] \quad (6)$$

$$k = \prod_{k=i+1}^{k\leq n}(1-A_k) \quad (7)$$

$$C = C_k + C_a + C_i \times k \quad (8)$$

$$C = C'_k + C_i \times k \quad (9)$$

$$C = K_a + K_d \sum_{i=0}^{i<n}(N \cdot L_i) \times I_i + K_s \sum_{i=0}^{i<n}(N \cdot H_i)^{ns} \times I_i \quad (10)$$

$$C = K_a + K_d \times S_d + K_s \times S_s \quad (11)$$

$$C = (C_{a_k} + A_i \times (C_i \times k_a + C_{a_a})) + \quad (12)$$
$$(C_{d_k} + A_i \times (C_i \times k_d + C_{d_a})) \times S_d +$$
$$(C_{s_k} + A_i \times (C_i \times k_s + C_{s_a})) \times S_S$$

$$C = (C_{a_k} + C_{d_k} \times S_d + C_{s_k} \times S_s) + \quad (13)$$
$$A_i \times (C_i \times (k_a + k_d \times S_d + k_s \times S_s) + (C_{a_a} + C_{d_a} \times S_d + C_{s_a} \times S_s))$$

$$C = C_k + A_i \times (C_i \times k + C_a) \quad (14)$$

where:

$$C_k = C_{a_k} + C_{d_k} \times S_d + C_{s_k} \times S_s$$

$$k = k_a + k_d \times S_d + k_s \times S_s$$

$$C_a = C_{a_a} + C_{d_a} \times S_d + C_{s_a} \times S_s$$

We claim:

1. An interactive method of a user updating the rendered display of a 3D object in response to user modification of the visual characteristics of said 3D object, said visual characteristics resulting from a combination of components independent of a texture applied to said 3D object and components dependent upon a texture applied to said 3D object, comprising the steps of:

(i) selecting a 3D object definition including geometric shape information;

(ii) selecting for subsequent modification one of a predefined texture associated with said 3D object and a new texture for rendering said 3D object;

(iii) determining for each pixel which is to be rendered for said selected 3D object on said display a value for each component of said visual characteristic information which is independent of modifications effected to said selected texture;

(iv) storing for each pixel which is to be rendered for said selected 3D object said determined value in a suitable storage means;

(v) rendering and displaying said selected 3D object by combining said stored determined values and values dependent upon said selected texture;

(vi) receiving input from said user representing an indication of one or more rendered pixels of said 3D object representing a portion of a said selected 3D object whose visual characteristics are to be modified and a user-selected modification including a texture therefor;

(vii) determining a new rendered value for each pixel of said selected 3D object in said portion by combining for each said pixel corresponding ones of said determined values stored in said suitable storage means with values dependent upon said texture selected by said user;

(viii) updating said display to show a rendering of said selected 3D object which includes said determined new rendered values for said pixels; and (ix) repeating steps (vi) through (viii) as desired.

2. The method of claim 1 further comprising step (x) of allowing the user to repeat steps (ii) through (ix) to modify said visual characteristics of said 3D object by selecting a different texture in step (vi).

3. The method of claim 1 further comprising the step of, prior to step (vi), storing a record of, for each rendered pixel of said selected 3D object, the pixel in said texture selected in step (ii) which corresponds to said rendered pixel.

4. The method of claim 3 wherein step (iv) further comprises determining, for each pixel in said selected texture, a bounding box encompassing at least all of the rendered pixels of said selected 3D object whose rendering is affected by a pixel in said selected texture and storing said determined bounding box in a storage means.

5. The method of claim 4 wherein the pixels to be processed in steps (vii) and (viii) are determined from bounding boxes stored for said indicated one or more pixels.

6. The method of claim 4 wherein, when in step (vi) the user indicates at least two pixels for modification, step (vii) further comprises forming a composite bounding box which subsumes the bounding boxes determined for each of said at least two pixels and wherein the pixels to be processed in steps (vii) and (viii) are determined from said composite bounding box.

7. The method of claim 3 wherein step (iv) further comprises defining groups of a preselected number of pixels in said selected texture and, for each group of pixels in said selected texture, determining a bounding box encompassing at least all of the rendered pixels of said selected 3D object whose rendering is affected by pixels in said group and storing said determined bounding box in said suitable storage means.

8. The method of claim 7 wherein the pixels to be processed in steps (vii) and (viii) are determined from said bounding boxes stored for the group corresponding to said indicated one or more pixels.

9. A computer implemented system for user modification of visual characteristics of said digital 3D objects, said visual characteristics resulting from a combination of components independent of a texture applied to said 3D object and components dependent upon a texture applied to said 3D object, the system comprising:

user input means to select a 3D object definition including a definition of the geometry of said 3D object;

user input means to select a first texture from at least one texture associated with said selected 3D object, each said at least one texture representing visual characteristic information of said selected 3D object to be evaluated when rendering pixels for display of said 3D object;

processor means to determine values for the components of visual characteristic information for said selected 3D object which are independent of said first selected texture;

storage means to store said determined values for said components;

rendering means to render pixels representing said 3D object for display on a display means by combining said values for determined components in said storage means and values for components dependent on said first selected texture;

user input means to select a second texture to replace said first selected texture;

user input means to select one or more rendered pixels representing said 3D object for application of said second selected texture thereto; and processor means to determine new values for said selected one or more pixels, said processor means combining said stored determined values and values for components dependent on said second selected texture.

10. A computer implemented system according to claim 9 wherein said user input means to select said first texture further comprises means to associate a new texture with said 3D object.

11. A computer implemented system according to claim 9 wherein said means to select one or more rendered pixels comprises means to receive input from a user indicating rendered pixels whose visual characteristic information is to be modified and means to determine the portions of said first selected texture which correspond thereto.

12. A computer implemented system according to claim 11 wherein said means to determine the portions comprises a memory including, for each rendered pixel, a pointer to a corresponding pixel in said first selected texture.

13. A computer implemented system according to claim 9 wherein said processor means to determine values for components further comprises means to define a bounding box for each pixel of said first selected texture, said defined bounding box encompassing at least all of the rendered pixels whose rendering is affected by the pixel of said first selected texture and wherein said storage means further includes means to store said determined bounding boxes.

14. In a computer implemented system for user-selected modification of the visual characteristics of digital 3D objects whose definitions include geometry information and at least one texture, to be rendered, said visual characteristics including components which are independent from said at least one texture and components that are dependent upon said at least one texture and wherein modification comprises the interactive modification of visual characteristics of a 3D object, a method of re-rendering the 3D object on a display when a user modification is performed, including the steps of:

(i) receiving input from said user to select one texture for the modification operation to act on;

(ii) determining, once said texture is selected and prior to commencement of the modification operation, the values of components of said visual characteristic information which are independent of said selected texture and storing said determined values for said components in a memory;

(iii) receiving input from said user representing desired portions of said selected texture to be affected by said modification operation;

(iv) determining new rendering values for said 3D object by combining values of components dependent on said selected texture corresponding to said desired portions with corresponding ones of said determined values stored in said memory; and (v) redisplaying said 3D object with said new rendering values to reflect said modifications effected by said modification operation.

15. An article of manufacture comprising:

a computer usable medium having computer readable program code means embodied therein for implementing a system for modification of the visual characteristics of 3D objects, the visual characteristics including components independent of a texture applied to said object and components dependent upon said texture, the computer readable program code means in said article of manufacture comprising:

computer readable program code means for causing the computer to accept input from a user representing the selection of a definition of a 3D object, the definition having associated therewith at least one texture comprising visual characteristic information of the 3D object which is subject to modification by said system and which is evaluated in rendering the 3D object on a display;

computer readable program code means for causing the computer to accept input from a user representing a selection of one texture for modification;

computer readable program code means for causing the computer to determine and store values for components of the visual characteristic information required to render and display the 3D object, the determined and stored values being independent of the one texture selected;

computer readable program code means for causing the computer to receive input from a user representing a selection of a modification operation and the portions of the selected texture which are to be modified by the selected modification operation; and computer readable program code means for causing the computer to re-render the modified portions of the 3D object corresponding to the modified portions of the selected texture, the re-rendering being accomplished by combining the corresponding stored values and values dependent upon.

* * * * *